Patented June 22, 1948

2,443,932

UNITED STATES PATENT OFFICE 2,443,932

WELDED STEEL ARTICLES AND METHOD FOR MAKING SAME

Edmund L. Roff, Chicago, and Henry B. Wantland, Evanston, Ill., assignors to Carnegie-Illinois Steel Corporation, a corporation of New Jersey No Drawing. Application November 30, 1945, Serial No. 632,129

8 Claims. (Cl. 148—21.54)

The present invention relates to welded steel articles and an improved heat and stress relieving treatment for the same.

This invention is primarily concerned with welded articles composed of steel containing .05 to .25 per cent carbon, .50 to 1.50 per cent manganese, .10 to .50 per cent silicon, .040, maximum, per cent phosphorus, .05, maximum, per cent sulphur, .50 to 1.00 per cent copper, 1.00 to 2.00 per cent nickel, and .0 to .50 per cent molybdenum, and the balance substantially iron except for the usual impurities or alloying elements in residual amounts. Such steel is characterized by developing high tensile and yield strengths by heat treatment, and by being readily weldable. However, the heat treatment heretofore practiced on welded articles composed of such steel, while effective to relieve the welding stresses therein, did not develop the full potential physical properties thereof.

It is accordingly an object of the present invention to provide a welded steel article composed of the foregoing steel having maximum physical properties and freedom from welding stresses.

It is a further object to provide a heat and stress-relieving treatment for welded articles composed of the foregoing steel which develops the full potential tensile and yield strengths combined with good ductility and which also effectively relieves the welding stresses.

The attainment of the foregoing objects will be described with particular reference to a preferred chemistry of steel as follows: .13 to .18 per cent carbon, .80 to 1.10 per cent manganese, .15 to .30 per cent silicon, .040, maximum, per cent phosphorus, .05, maximum, per cent sulphur, .60 to .80 per cent copper, 1.25 to 1.60 per cent nickel, and .20 to .30 per cent molybdenum. The steel should be fully killed, preferably with aluminum and controlled to a grain size of five, or higher, as determined by comparison with the A. S. T. M. standard chart.

In order to obtain maximum results, particularly with respect to ductility, as determined by elongation, the copper and nickel should be maintained in the ratio of about one part copper to two parts nickel.

Such steel is capable of developing a high yield strength upon suitable heat treatment and is readily weldable. However, after welding, it is necessary to give the welded articles produced from such steel a stress-relieving treatment. The conventional method of relieving the welding stresses has been to heat the welded articles to a temperature not exceeding 1150° F., soak for a sufficient time at such temperature, and slowly cool to room temperature. While such treatment is effective to relieve the welding, it does not develop the full potential physical characteristics, such as tensile strength and yield strength.

We have discovered that the improved physical properties desired can be obtained by holding the welded articles within the temperature range of 700° to 1000° F. for sufficient time to permit the steel to harden by precipitation, accompanied by an agglomeration or spheroidization of the pearlite. Due to the aforesaid copper-nickel ratio, this agglomeration or spheroidization takes place at temperatures much lower than is the case of ordinary steels. Following such treatment, the articles may be soaked at 1050° to 1200° F. for a suitable length of time to properly relieve the welding stresses without deleteriously affecting the physical properties effected by the prior thermal treatment.

We have determined that the precipitation hardening may be done in either of two ways, viz.

1. Holding the welded articles at a suitable temperature between 700° and 1000° F., such as, 950° F. for sufficient time for the reactions to be carried to completion followed by a suitable stress-relieving operation; or 2. Slowly heating the welded articles to a specified stress-relieving temperature of 1050° to 1200° F. at a rate not exceeding an increase of 150° F. per hour through the range of 700° to 1000° F. to keep the steel within such range for sufficient time for the reactions to be carried to completion.

The following tabulation of test data illustrates the results obtainable with such methods as contrasted to conventional stress relieving at 1150° F. The properties of the steel in the hot rolled condition are also listed. The results are given in units of one thousand pounds per square inch. All heat-treated samples were cooled in the furnace from the final temperature to 600° F.

| | Tensile Strength | | | Yield Point (.1% Set) | | | Elongation (Per cent in 2 inches) | | |
|---|---|---|---|---|---|---|---|---|---|
| Plate thickness, inches | ½ | ⅝ | ¾ | ½ | ⅝ | ¾ | ½ | ⅝ | ¾ |
| Charged in the furnace at 950° F., soaked 4 hours, heated to 1100° F., soaked 4 hours | 101.3 | 98.4 | 99.9 | 80.4 | 73.5 | 70.1 | 33 | 36 | 36 |
| Charged in the furnace at 400° F., heated at 135° F./hour to 1050° F. | 104.2 | 100.0 | 102.2 | 75.3 | 77.7 | 74.9 | 30 | 33 | 36 |
| Charged in the furnace at 1150° F., soaked 4 hours | 91.0 | 88.6 | 88.9 | 67.9 | 61.5 | 58.0 | 35 | 36 | 40 |
| Hot Rolled only | 99.2 | 96.1 | 98.0 | 66.4 | 55.3 | 60.5 | 34 | 32 | 31 |

A comparison of the figures of the above tabulation indicates that little beneficial change from the hot rolled properties is effected by conventional stress relieving. The tensile strength is materially reduced while the yield strength on the average is increased slightly. The tabulation shows that treatment by the two methods set forth hereinbefore, results in material gains in tensile and yield strength without materially lowering the elongation, and in some cases, the elongation is actually increased. It also shows that the higher physical properties are retained after stress relieving. Other experiments have proven this to be true so long as the stress relieving is done in the range of 1050° to 1200° F. Thus, by following the teachings of the present invention, optimum physical properties can be obtained in stress-relieved welded articles.

Thus the combination of steel composition and thermal treatment described herein provides stress-relieved welded steel articles having good elongation associated with elevated yield strength, the elongation being greater than 25.0 per cent in two inches and the yield point being greater than 70,000 pounds per square inch.

While we have shown and described two specific examples of our invention, it will be understood that these examples are merely for the purpose of illustration and description and that various other forms may be devised within the scope of our invention, as defined in the appended claims.

We claim:

1. The method of precipitation hardening and stress relieving welded steel articles composed of killed steel containing .05 to .25 per cent carbon, .50 to 1.50 per cent manganese, .040, maximum, per cent phosphorus, .05, maximum, per cent sulphur, .50 to 1.00 per cent copper, 1.00 to 2.00 per cent nickel, the percentage of nickel being approximately twice the percentage of copper, up to .50 percent molybdenum, comprising maintaining the articles between 700 and 1000° F. for sufficient time for the steel thereof to be hardened by precipitation followed by a stress-relieving treatment at a temperature between 1050° and 1200° F.

2. The method of precipitation hardening and stress relieving welded steel articles composed of killed steel containing .05 to .25 per cent carbon, .50 to 1.50 per cent manganese, .040, maximum, per cent phosphorus, .05, maximum, per cent sulphur, .50 to 1.00 per cent copper, 1.00 to 2.00 per cent nickel, up to .50 per cent molybdenum, comprising holding said articles at a temperature between 700° and 1000° F. until the steel thereof has hardened by precipitation, then raising the temperature thereof to a point between 1050° and 1200° F. and holding them at such temperature until the welding stresses have been relieved.

3. The method of precipitation hardening and stress relieving welded steel articles composed of killed steel containing .13 to .18 per cent carbon, .80 to 1.10 per cent manganese, .040, maximum, per cent phosphorus, .05, maximum, per cent sulphur, .60 to .80 per cent copper, 1.25 to 1.60 per cent nickel and .20 to .30 per cent molybdenum, comprising slowly heating said articles to within the temperature range of 1050° to 1200° F., said heating being at a rate of less than 150° F. per hour through the range of 700° to 1000° F. to keep said articles in the said range of 700° to 1000° F. for sufficient time for the steel thereof to harden by precipitation and holding at the maximum temperature until the welding stresses are relieved.

4. The method of precipitation hardening and stress relieving welded steel articles composed of killed steel containing .13 to .18 per cent carbon, .80 to 1.10 per cent manganese. 040, maximum, per cent phosphorus, .05, maximum, per cent sulphur, .60 to .80 per cent copper, 1.25 to 1.60 per cent nickel, .20 to .30 per cent molybdenum, comprising holding said articles at a temperature between 700° and 1000° F. for at least four hours, then raising the temperature to a point between 1050° and 1200° F. and holding them at such temperature for at least four hours.

5. The method of precipitation hardening and stress relieving welded steel articles composed of killed steel containing .13 to .18 per cent carbon, .80 to 1.10 per cent manganese, .15 to .30 per cent silicon, .040, maximum, per cent phosphorus, .05, maximum, per cent sulphur, .60 to .80 per cent copper, 1.25 to 1.60 per cent nickel, the percentage of nickel being approximately twice that of the copper, and .20 to .30 per cent molybdenum, comprising slowly heating said articles to within the temperature range of 1050° to 1200° F., said heating being at a rate of less than 150° F. per hour through the range of 700° to 1000° F. to keep said articles in the said range of 700° to 1000° F. for sufficient time for the steel thereof to harden by precipitation and holding at the maximum temperature until the welding stresses are relieved.

6. The method of precipitation hardening and stress relieving welded steel articles composed of killed steel containing .13 to .18 per cent carbon, .80 to 1.10 per cent manganese, .15 to .30 per cent silicon, .040, maximum, per cent phosphorus, .05, maximum, per cent sulphur, .60 to .80 per cent copper, 1.25 to 1.60 per cent nickel, the percentage of nickel being approximately twice that of the copper, and .20 to .30 per cent molybdenum, comprising holding said articles at a temperature between 700° and 1000° F. until the steel thereof has hardened by precipitation, then raising the temperature thereof to a point between 1050° and 1200° F. and holding them at such temperature until the welding stresses have been relieved.

7. The method of precipitation hardening and stress relieving welded steel articles composed of killed steel containing .13 to .18 per cent carbon, .80 to 1.10 per cent manganese, .15 to .30 per cent silicon, .040, maximum, per cent phosphorus, .05, maximum, per cent sulphur, .60 to .80 per cent copper, 1.25 to 1.60 per cent nickel, the percentage of nickel being approximately twice that of the copper, and .20 to .30 per cent molybdenum, comprising holding said articles at a temperature of about 950° F. for at least four hours, then relieving the welding stresses therein by raising the temperature thereof to a point between 1050° and 1200° F. and holding at such temperature for about four hours.

8. A heat-treated welded steel article composed of killed steel containing .05 to .25 per cent carbon, .50 to 1.50 per cent manganese, .040, maximum, per cent phosphorus, .05, maximum, per cent sulphur, .50 to 1 per cent copper, 1 to 2 per cent nickel, up to .50 per cent molybdenum, said article being characterized by having a precipitation hardened and stress relieved structure imparted by maintaining it in the temperature range of 700° to 1000° F. for a sufficient time to precipitation harden the steel thereof followed by holding it within the temperature range of 1050° to 1200° F. for sufficient time to relieve the welding stresses.

EDMUND L. ROFF.
HENRY B. WANTLAND.

REFERENCES CITED

The following references are of record in the file of this patent:

UNITED STATES PATENTS

| Number | Name | Date |
| --- | --- | --- |
| 2,319,250 | Mitchell | May 18, 1943 |

OTHER REFERENCES

Metals Handbook, 1939 edition, page 249; published by the American Society for Metals, Cleveland, Ohio.